UNITED STATES PATENT OFFICE 2,147,533

SOLUTION OF TITANIC HYDROXIDE IN HYDROGEN PEROXIDE

Samuel Katzoff, Hampton, Va., and Reuben Roseman, Baltimore, Md.

No Drawing. Application June 8, 1937, Serial No. 147,146

14 Claims. (Cl. 23—183)

This invention relates to a new composition of matter, viz. a solution of titanic hydroxide in hydrogen peroxide which may be appropriately designated as a pertitanic acid sol, together with related solutions, jellies and gels, and to processes for obtaining the same.

One object of the invention is to provide a solution of titanic hydroxide in hydrogen peroxide which solution is adapted to a variety of applications in the are and industries. For example, it is useful in mordanting and tanning; for weighting and delustering silk, rayon and other fibrous materials; for impregnating wood, textiles, paper, etc.; for bleaching purposes; and for medicinal purposes. It supplies a translucent adherent coating, where that is desirable, for the surfaces of materials such as wood, glass, ceramics, etc.

Another object of the invention is to provide a method for dissolving titanic hydroxide in hydrogen peroxide, which method may be practiced not only with the ingredients in bulk, but also on a microscopic scale as well; as for instance in the fibers of a textile or leather material. The invention thus gives rise to new methods of mordanting or tanning.

Other objects of the invention are to provide a solution, and to effect the solution, of a mixture of titanic hydroxide and ferric hydroxide in hydrogen peroxide. This solution is likewise adapted to a variety of applications in the arts and industries similar to those indicated above.

Other objects of the invention are to produce related jellies, useful for such purposes as the above, either directly, or after dilution with water to form solutions similar to the above, and gels, useful in catalysts.

Still other objects and uses will be obvious to those skilled in the art from the following detailed description of the invention.

We have found that freshly precipitated and well-washed titanic hydroxide dissolves in dilute hydrogen peroxide, to give a clear yellow solution.

The titanic hydroxide may be obtained by any of several known methods. One, for example, is to add a 0.25% ammonia ($NH_3$) solution to a 0.6% solution of the double oxalate of potassium and titanium [$K_2TiO(C_2O_4)_2.2H_2O$] in the cold to produce orthotitanic acid [$Ti(OH)_4$]. According to our method, the titanic hydroxide is first thoroughly washed with a good grade of wash water, preferably distilled. Any of the usual methods of washing such precipitates is satisfactory; it is desirable, however, to avoid long exposure to high temperatures, or extensive drying of the precipitate at any time. Ordinary washing by decantation is, for example, satisfactory, provided that electrolytes are substantially removed.

Hydrogen peroxide is next added to the washed titanic hydroxide. It will readily dissolve, or peptize, the latter, giving a clear yellow solution. The time required depends on the proportions of the ingredients used, and on the temperature. For example, 50 cc. of a suspension containing 0.0035 mole of $Ti(OH)_4$ treated with 0.4 cc. of 30% $H_2O_2$ (0.0039 mole) becomes clear within an hour at room temperature, or within a few minutes when warmed. Larger proportions of hydrogen peroxide hasten solution and give clearer solutions, while lesser proportions give solutions with pronounced opalescence. If the titanic hydroxide precipitate is relatively concentrated, it will tend to give a yellow jelly or gel instead of a yellow solution.

Small amounts or traces of base aid solution, especially where the titanic hydroxide is impure. Indeed, we have discovered that, with varying proportions of base and of hydrogen peroxide, colloidal solutions can be made ranging between the colloidal solutions above described and the known molecular (non-colloidal) solutions of pertitanates. From the foregoing, it will be obvious that the amount of base used to obtain the above mentioned colloidal solutions will be less than sufficient to produce molecular solutions; in other words, the amount of base useful in the present invention is less than the stoichiometric proportion operable to make such molecular solutions with the titanium hydroxide.

The solutions have colloidal properties, as exemplified by failure to diffuse through a collodion membrane, and colloidal precipitation or gelling by electrolytes.

Ferric hydroxide alone will not dissolve in hydrogen peroxide. According to our invention, however, co-precipitated and well-washed titanic hydroxide-ferric hydroxide mixture will dissolve in hydrogen peroxide, to give a clear brown solution. For example, 50 cc. of a suspension containing 0.0028 mole of $Ti(OH)_4$ and 0.0007 mole of $Fe(OH)_3$, treated with 1 cc. of 30% $H_2O_2$ (0.010 mole), becomes clear within an hour at room temperature, or within a few minutes when warmed. As before, small amounts or traces of base aid solution, especially where the titanic hydroxide-ferric hydroxide mixture is impure. The properties of these solutions are, in general, the same as those made from titanic hydroxide alone.

In fact, there is a close correspondence between the properties of the Ti(OH)₄—Fe(OH)₃ mixture and the Ti(OH)₄.

It is to be understood that where ferric or iron hydroxide is named in the appended claims an equivalent metallic hydroxide may be substituted within the scope of the invention.

Gels can be obtained from the above-mentioned solutions by boiling and/or evaporating, or by such methods as adding electrolytes cautiously, or adding alcohol.

The solutions, jellies and gels described can be produced in the interstices or within the fibers of leather, textiles or the like. Thus, a precipitate of titanic hydroxide is first produced in the material, as, for example, by soaking it in a dilute solution of a titanium salt, and then adding a dilute solution of base, using, for example, the same compounds previously specified (potassium titanium oxalate and ammonia). The material is washed and then treated with hydrogen peroxide in accordance with our method.

The term "hydrosol" used herein may be defined as a colloidal system in which the dispersion medium is principally water.

Having thus described our invention, what is claimed is:—

1. A colloidal solution comprising titanic hydroxide and hydrogen peroxide.

2. A hydrosol comprising titanic hydroxide, hydrogen peroxide and a base.

3. A hydrosol of pertitanic acid and ferric hydroxide colloidally dispersed therein by co-precipitation and co-solution.

4. A colloidal solution comprising hydrogen peroxide, a base, titanic hydroxide and ferric hydroxide colloidally dispersed therein by co-precipitation and co-solution.

5. The process of obtaining a colloidal solution of titanium hydroxide and iron hydroxide in hydrogen peroxide, which comprises co-precipitating the said hydroxides and mixing the co-precipitated hydroxides with hydrogen peroxide.

6. The process of obtaining a hydrosol of titanium hydroxide and iron hydroxide in hydrogen peroxide, which comprises co-precipitating the said hydroxides and mixing the co-precipitated hydroxides with hydrogen peroxide in the presence of base.

7. The process of making a colloidal jelly or gel which comprises co-precipitating iron and titanium hydroxides, concentrating the same, and then mixing hydrogen peroxide with the concentrated co-precipitated titanium hydroxide and iron hydroxide.

8. The process of making a colloidal jelly or gel which comprises co-precipitating iron and titanium hydroxides, concentrating the same, and then mixing hydrogen peroxide with the concentrated coprecipitated titanium hydroxide and iron hydroxide in the presence of base.

9. The process of making a colloidal jelly or gel which comprises co-precipitating iron and titanium hydroxides, and mixing hydrogen peroxide with the co-precipitated titanium hydroxide and iron hydroxide in the presence of electrolyte.

10. The process of obtaining a colloidal solution containing titanium hydroxide in dispersed phase, which comprises precipitating orthotitanic acid from a solution of a titanium compound, washing the fresh precipitate to remove harmful electrolytes, and then mixing hydrogen peroxide with said precipitate while moist.

11. The process of obtaining a colloidal solution containing titanium hydroxide in dispersed phase, which comprises precipitating orthotitanic acid from a solution of a titanium compound, separating the precipitate, and then adding hydrogen peroxide to the said precipitate while moist, and in the presence of a base, said base being less than an amount which would cause molecular solution.

12. A colloidal gel comprising titanium hydroxide and hydrogen peroxide.

13. The process of treating a porous material which comprises preparing a moist precipitate of titanium hydroxide within its pores or interstices and subsequently adding hydrogen peroxide.

14. The process of treating a porous material which comprises preparing within its pores or interstices moist co-precipitated titanium hydroxide and iron hydroxide and subsequently adding hydrogen peroxide.

SAMUEL KATZOFF.
REUBEN ROSEMAN.